Aug. 25, 1925.
A. W. SCHRAMM
1,551,332
BRACKET ARM JOINT
Filed Aug. 27, 1921   3 Sheets-Sheet 1
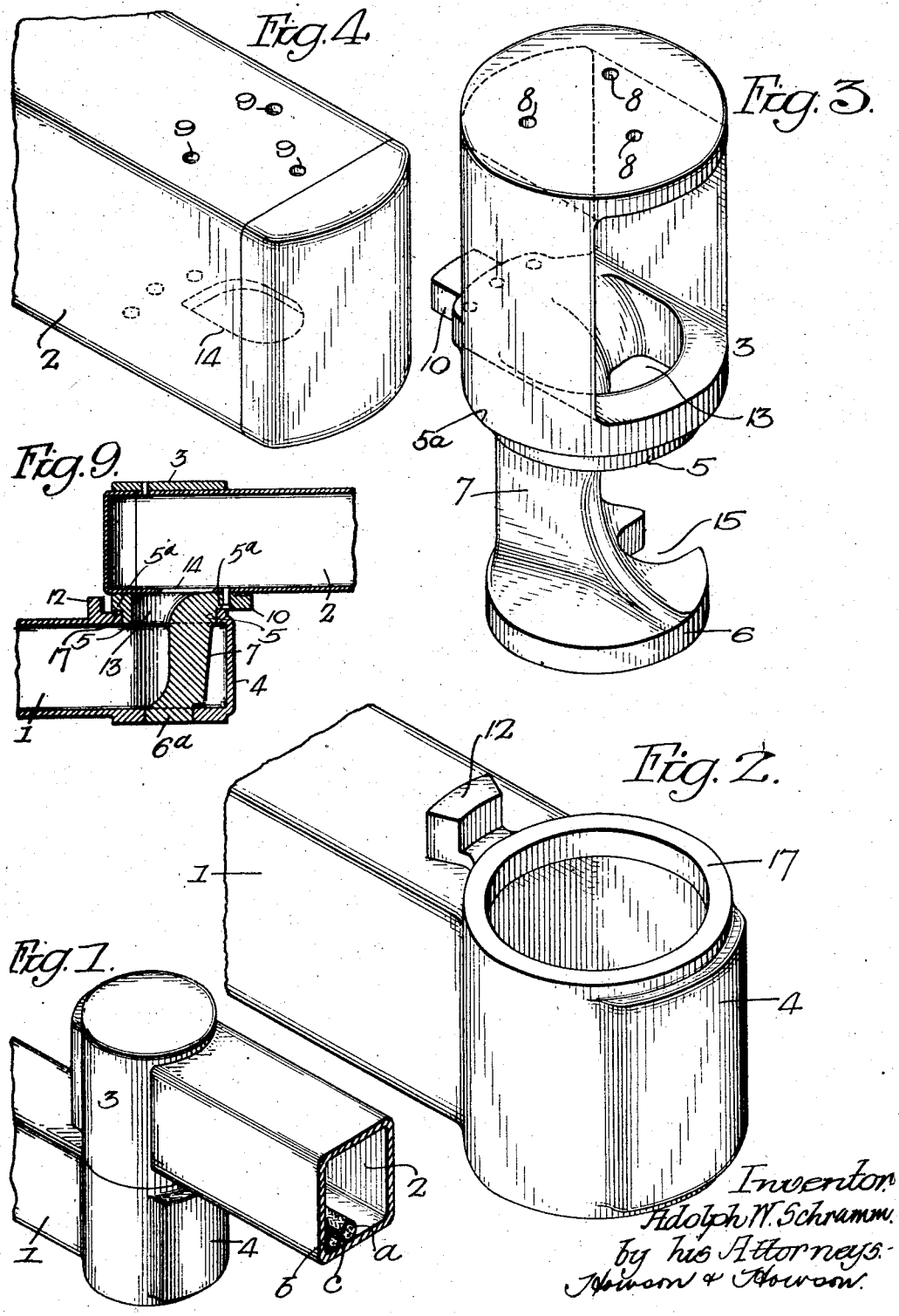
Inventor:
Adolph W. Schramm.
by his Attorneys.
Howson & Howson.

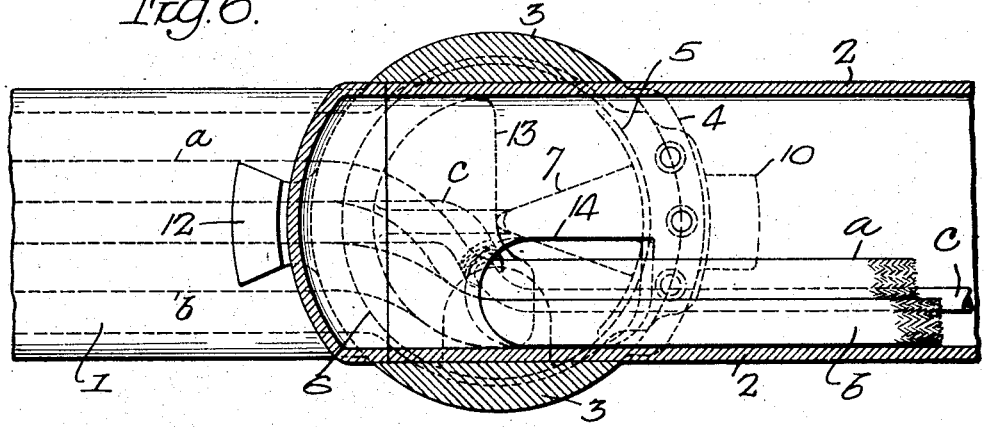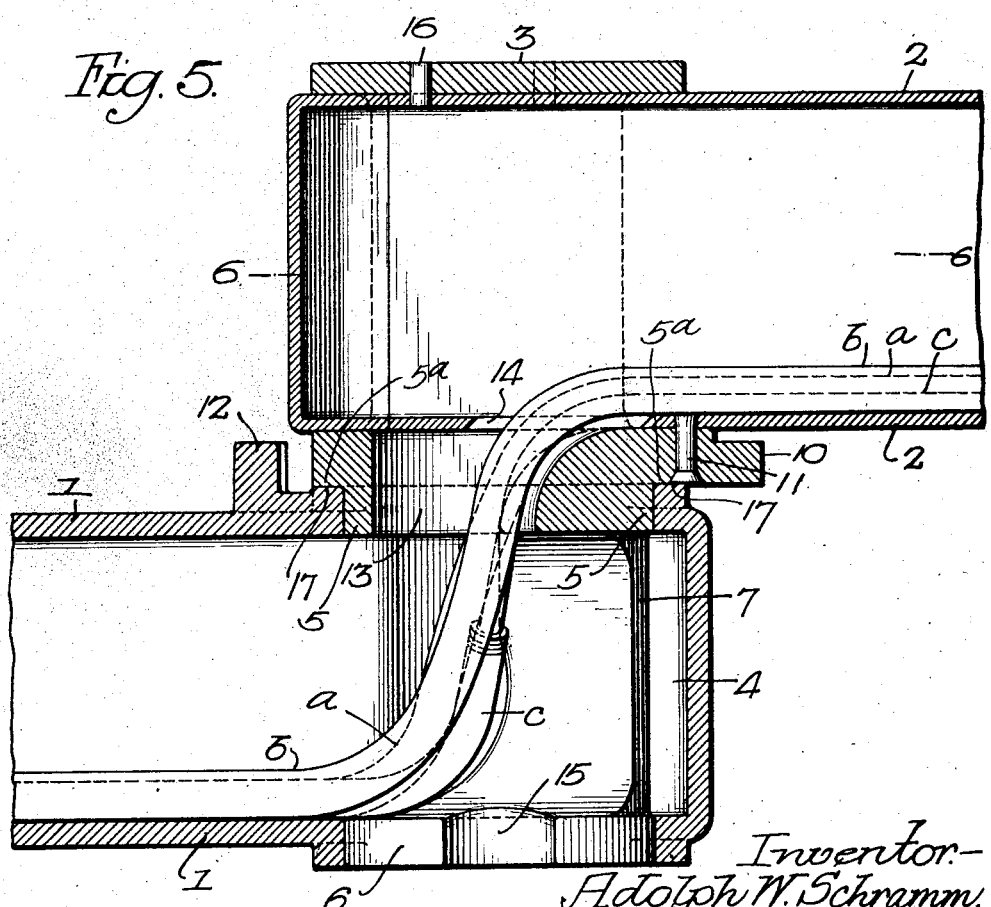

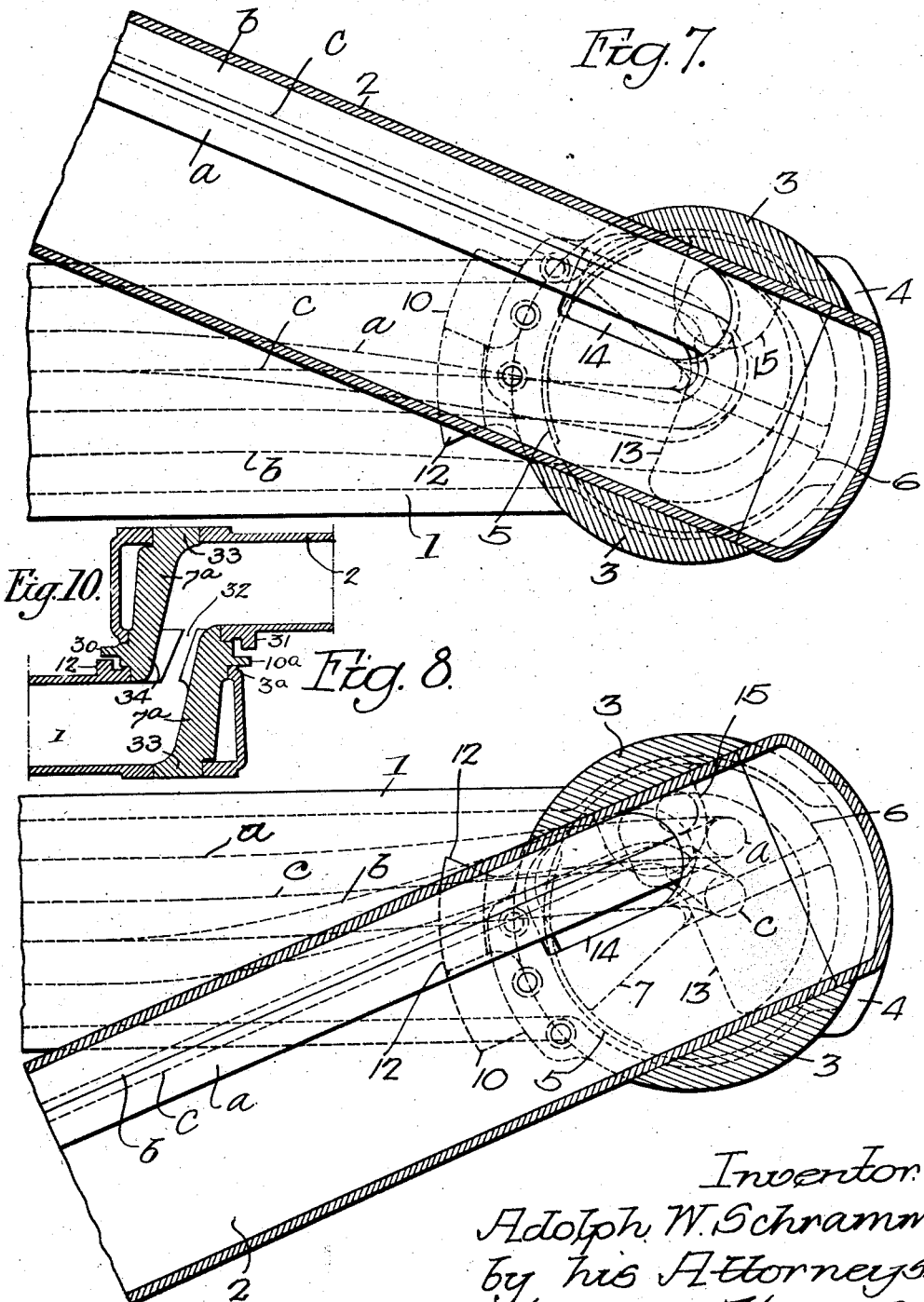

Patented Aug. 25, 1925.

1,551,332

UNITED STATES PATENT OFFICE.

ADOLPH W. SCHRAMM, OF RIVERTON, NEW JERSEY, ASSIGNOR TO ELECTRO DENTAL MANUFACTURING COMPANY, OF PHILADELPHIA, PENNSYLVANIA, A CORPORATION OF PENNSYLVANIA.

BRACKET-ARM JOINT.

Application filed August 27, 1921. Serial No. 495,860.

*To all whom it may concern:*

Be it known that I, ADOLPH W. SCHRAMM, a citizen of the United States, residing in Riverton, New Jersey, have invented the Bracket-Arm Joint, of which the following is a specification.

One object of this invention is to provide a novel form of flexible elbow joint, particularly designed to connect two conduits in such manner as to permit of their relative movement through a large angle, without damage to electrical- or fluid carrying conductors extending through them.

It is further desired to provide a novel form of flexible joint of the above type, which shall be simple and substantial in construction, as well as easily assembled or opened to permit of the insertion, removal or inspection of the conductors which it contains.

Another object of my invention is to provide a bracket arm joint especially adapted for use in connection with dental apparatus and which shall include two pivotally connected portions capable of carrying electrical or fluid conductors, and whose construction shall be such as to permit of a large relative movement of its parts upon or relatively to their connecting pivot or pintle without injury to the conductors, while being particularly adapted to support a structure such as a table, dental apparatus or the like.

These objects and other advantageous ends I attain as hereinafter set forth, reference being had to the accompanying drawings, in which, Fig. 1 is a perspective view on a reduced scale, illustrating a bracket arm joint constructed in accordance with my invention;

Figs. 2, 3 and 4 are detached perspective views of the parts constituting the joint shown in Fig. 1;

Fig. 5 is a longitudinal vertical section of the complete joint, illustrating the relative positions occupied by the electrical and air conductors therein;

Fig. 6 is a horizontal section on the line 6—6, Fig. 5, with the arms in such positions that their longitudinal center lines lie in the same vertical plane;

Figs. 7 and 8 are horizontal sections similar to Fig. 6, showing the movable arm of the joint in its two extreme positions; and Figs. 9 and 10 are fragmentary vertical sections similar to that of Fig. 5, illustrating modifications of my invention.

In the above drawings 1 represents a relatively fixed supporting arm carried by any suitable supporting structure and serving to pivotally support a relatively movable arm 2, for which purpose said arms are connected by a pivot structure or pintle 3 (Fig. 3). Both of said arms are hollow and while in the present case they have been illustrated as substantially rectangular in cross section, obviously they may have any other desired cross sectional form without departing from my invention.

In order to suitably receive the member 3, the arm 1 terminates in a substantially cylindrical head 4 open at its top and bottom ends, of which the former is designed to provide a bearing for rotatably receiving a shoulder $5^a$ on the pivot member 3 about midway between its top and bottom faces and including a bearing portion 5. The lower end or foot portion 6 of said member is formed to rotatably fit into the bottom end of the head 4 and is connected by a column 7 at one side thereof with the central portion of the member 3. The upper part or body portion of the latter is cylindrical in form and has an opening for the reception of the closed end of the movable arm 2. The latter is rigidly held at the top to the member 3 by a set of screws or rivets 16 passing through holes 8 and 9 in said members and at the bottom a second series of screws or rivets 11 extends into a projection 10 from the member 3. The lug 10 serves as a movement-limiting member, for which purpose an upwardly projecting stop in the form of a lug 12 is formed on the fixed arm 1 in such position as to cooperate with it so that the pivot member of the arm 2 in this form of my invention, is limited in its rotation to an angle of about 320°, although obviously this will vary with the proportions of the stop 12 as determined by the size of the column 7, the width of the opening into the arm 1 and the size of the conductors in the joint.

To permit of the passage of conductors, such as are indicated at $a$, $b$, and $c$, from the fixed arm into the movable arm 2, an opening 13 is provided through the bottom of the cylindrical portion of the pivot member 3, which communicates with the interior of the arm 2 through an opening 14 provided in the bottom thereof. The disc 6 forming the bottom portion of the pivot member 3 has an edge opening, preferably vertically under a portion of the opening 13 and of such a size as to be capable of receiving the conductors $a$, $b$ and $c$ when the movable arm 2 with its pivot member 3 is being moved axially into or out of the head 4 of the fixed arm 1.

For example, when the parts of the joint are to be assembled, the movable arm 2 is first inserted in the opening of the cylindrical upper portion of the pivot member 3 to which it is rigidly connected by the screws or rivets 11 and 16. Thereafter the conductors $a$, $b$ and $c$ are run through the fixed arm 1 and upwardly out of the top opening of the head thereof, passing thence through the notch or depression 15 in the bottom part 6 of the member 3, up through the opening 13 thereof and through the opening 14 in the bottom of the arm 2. Obviously the procedure of assembling the above parts may be modified as may be desirable or necessary without departing from my invention. The pivot member 3 with the conductors may now be entered in the top opening of the head 4 and as the shoulder $5^a$ of said pivot member comes to a bearing on the upper end 17 of the head, the inner surface of the arm 1 lifts the conductors out of the recess 15 so that they pass directly from the interior of said arm 1 through the openings 13 and 14 into the arm 2, the foot section 6 at the same time coming to bearing in the bottom of the head 4, as shown in Fig. 5.

It is to be understood that the corners or edges of the column 7 as well as of the holes 13 and 14, are rounded so as to avoid abrasion of or other injury to the conductors $a$, $b$ and $c$, which owing to the construction above noted, are not injured by nor do they interfere with the swinging of the arm 2 with the pivot structure 3 on the arm 1, even though such movement be carried from the extreme position shown in Fig. 7 to the other extreme position shown in Fig. 8 as limited by the coacting lugs 10 and 12.

Owing to the construction of the arms and pivot member, as well as to the substantial design and ample bearings between the latter and the arm 1, objects of considerable weight may be supported on the arm 2 without injury to the joint or interference with its desired operation. Whenever desired, the arm 2 with the pivot member 3 may be separated from the arm 1 by moving them vertically to the latter, it being understood that the conductors $a$, $b$ and $c$ have sufficient slack to permit of this movement, during which they enter or are moved into the recess 15 of the foot section 6 as this is withdrawn from the head 4.

Without departing from my invention I may practically omit the disc-like foot portion 6 and journal the lower end $6^a$ of the column 7 in a suitably formed bearing in the bottom of the head 4. This construction, like that of the other shown, facilitates the assembly and separation of the parts of the joint while bracing it to properly support considerable weights on the arm 2.

Again, as shown in Fig. 10, I may form the pivot or pintle member having a body portion in the shape of a perforated disc 34, having portions $7^a$ projecting in opposite directions from its two faces and respectively including journal portions rotatably fitting main openings in the arms 1 and 2. Each of these projecting portions likewise has a relatively smaller cylindrical end 33 rotatably fitting into a corresponding bearing in the arm into which it extends so as to be concentric with the main opening thereof. Said pivot member has projecting from its body two oppositely placed stops 30 and $10^a$ designed to cooperate with two fixed stops 12 and 31 respectively mounted on the arms 1 and 2. By this means relative movement of said arms is limited to something less than two revolutions.

In order to facilitate the insertion and removal of the conductors as well as to make easy the assembling of the parts of the joint, I provide a slot 32 into the passage through the disc to permit of the convenient insertion and removal of said conductors.

I claim:

1. The combination in a bracket arm joint of two hollow arms; with a pintle fixed to one of said arms and having two separated bearing portions rotatably engaging the other arm, said pintle having an opening adapted to receive conductors extending between said arms, respectively; and means for limiting movement of one arm relatively to the other.

2. The combination in a bracket arm joint of two hollow arms; a pintle engaging one of said arms and having a plurality of separated bearing portions rotatably engaging the other arm; the arms and pintle being formed to receive conductors and one of the bearing portions being recessed to receive the conductors when the parts of the joint are being separated or assembled.

3. The combination in a bracket arm joint of a pintle having a head and a foot portion; an arm having bearings for said portions of the pintle; a second arm associated with the head portion of the pintle, there being registering openings in the pintle and in said second arm; with means for limiting the rotation of said pintle in the bearings of the first arm.

4. The combination in a bracket arm joint of a hollow arm having a socket formed with top and bottom bearings; a pintle having a head and including portions rotatably fitting the top and bottom bearings of the socket; with a second arm extending into the head of the pintle and having an opening through the latter into the first arm; said arms and pintle being formed to receive conductors.

5. The combination in a bracket arm joint of a pair of hollow arms of which one has aligned top and bottom bearings; a hollow structure including portions rotatably fitting into the bearings of said arm; the portion of the structure which enters the bottom bearing of the arm being formed to pass with the conductors through the top bearing during the assembly of the parts of the joint, the arm and said structure being formed to receive conductors.

6. The combination in a bracket arm joint of a hollow arm having a socket formed with opposite bearings; a pintle including a foot rotatably fitting one of said bearings and an intermediate portion rotatably fitting the other bearing, said intermediate portion having an opening; a column connecting said foot and intermediate portions of the pintle at one side thereof; a second arm having an opening communicating with the space between the intermediate and foot portions of the pintle; with means for limiting the rotation of the pintle with its arm relatively to the first arm.

7. The combination in a bracket arm joint of a hollow arm having a socket formed with opposite bearings; a pintle including a foot rotatably fitting one of said bearings and an intermediate portion rotatably fitting the other bearing; a column connecting said foot and intermediate portions of the pintle; a second arm having an opening communicating with the space between the intermediate and foot portions of the pintle; means for limiting the rotation of the pintle with its arm relatively to the first arm, the foot portion of the pintle having an edge recess; and said parts being arranged to permit of conductors extending from one of the arms through the pintle into the other arm when said conductors are in positions to enter said recess of the foot as the pintle is being separated from or assembled with the first arm.

8. The combination in a bracket arm joint of two hollow arms; with a pintle having a body portion formed with an opening; and including two journal portions rotatably engaging one of the arms; said joint being formed to permit conductors being extended from one arm to the other through said opening.

ADOLPH W. SCHRAMM.